3,417,003
POLYMER DEPOSIT ELECTROCHEMICALLY

Sidney D. Ross and Raymond C. Petersen, Williamstown, and Manuel Finkelstein, North Adams, Mass., assignors to Sprague Electric Company, North Adams, Mass., a corporation of Massachusetts
No Drawing. Filed Feb. 21, 1966, Ser. No. 528,804
10 Claims. (Cl. 204—14)

The present invention relates to a method of electrochemically depositing a polymer on a metal surface.

It is known in the art to employ polymeric films as the dielectric layer of electrical capacitors. These films are employed as separate layers merely rolled into contact with an electrode foil, or they are heat or pressure laminated to one or more foils. Certain polymeric films can be vapor deposited on cooled metal surfaces.

These processes all have at least one serious drawback; either the film is too thick, it varies in thickness, it has pinholes, or it is too impractical and expensive.

The present invention is concerned with a new process for depositing controlled thicknesses of a polymeric dielectric film on a metal surface.

In accordance with the invention the process involves electrochemically depositing on a metal surface an organic polymer comprising making said metal the cathode in a solution of a solvent containing a mono- or bis-onium salt, immersing an anode in said solution and subjecting said solution to electrolysis, whereby said polymer deposits on said cathode.

The general formula of the polymer is:

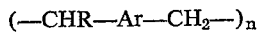

wherein $n$ is greater than 10; R is hydrogen or a monovalent hydrocarbon; and Ar is a divalent aromatic radical, the two valences of which are located on each terminal carbon atom of a chain of 2 or 4 of the ring atoms, said chain having one unit of aromatic unsaturation for each two ring atoms. The Ar group may have substituents such as R groups, halogen, sulfur, etc. thereon.

The precursor of the polymer is a mono- or bis-onium salt selected from the group consisting of

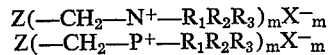

and

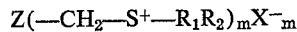

wherein $m$ is 1 or 2; $R_1$, $R_2$ and $R_3$ are $C_1$–$C_{18}$ hydrocarbyl groups; Z is an aromatic ring; and X is the anion of a strong inorganic acid. When $m$ is 1, the methylene radical is attached to a carbon atom of said aromatic ring so as to be separated by a chain of 2 or 4 ring atoms from an hydrocarbyl group attached to another ring carbon atom. When $m$ is 2, the methylene radicals are attached to different carbon atoms of the aromatic ring so as to be separated by a chain of 2 or 4 ring atoms. Z may have noninterfering R groups, halogen, sulfur, etc. thereon.

Example I

Two grams of p-methylbenzyltrimethyl-ammonium nitrate was dissolved in 30 ml. of dimethylformamide. An aluminum cathode and a platinum anode was immersed in this solution. The nitrate salt was subjected to electrolysis at a voltage of 25 volts for a period of 1 hour. During this time the current dropped from an initial value of 200 ma. to a final value of 20 ma. A continuous, adherent film of poly-p-xylylene was deposited on the cathode.

Example II

Four grams of p-xylylene bistrimethylammonium nitrate was dissolved in 50 ml. of dimethylformamide containing 5 ml. of water. An aluminum cathode and a platinum anode was immersed in this solution. Electrolysis of this solution at 100 ma. resulted in a comparatively heavy coating of poly-p-xylylene on the aluminum cathode.

Example III

Four grams of p-xylylene bistributylphosphonium nitrate are dissolved in 50 ml. of formamide. An aluminum cathode and a platinum anode is immersed in this solution. Electrolysis of this solution at 200 ma. for about 2 hours will deposit poly-p-xylylene on the aluminum cathode.

Example IV

Three grams of p-methylbenzyltriphenylphosphonium nitrate are dissolved in 30 ml. of formamide. Using the same electrode system as in the preceding examples, the solution is subjected to electrolysis at 200 ma. for a period of about 1 hour. Poly-p-xylylene will deposit on the cathode.

Example V

Three grams of p-methylbenzyldimethyl sulfonium nitrate are dissolved in 30 ml. of formamide. Using the same electrode system as in the preceding example, the solution is subjected to 200 ma. for a period of about 1 hour to form poly-p-xylylene on the cathode.

Example VI

Four grams of 2,5-pyrroledimethylene-bis-(trimethylammonium nitrate) are dissolved in 50 ml. of formamide. Using the same electrode system, the solution is subjected to 200 ma. for about 1 hour to form poly 2,5-pyrroledimethylene on the cathode.

Example VII

Three grams of 2,5-pyridinedimethylene bis-(trimethylammonium nitrate) are dissolved in 30 ml. of formamide. Using the same electrode system, the solution is subjected to 200 ma. for about 2 hours to form poly 2,5-pyridinedimethylene on the cathode.

Example VIII

Three grams of 2,5-furandimethylenebis-(trimethylammonium nitrate) are dissolved in 50 ml. of formamide. Using the same electrode system as in the preceding examples the solution is subjected to 200 ma. for 1 hour to form poly-2,5-furandimethylene on the cathode.

Example IX

Three grams of 5-methyl-2-thenyltrimethylammonium nitrate is dissolved in 50 ml. of formamide. Using the same electrode system, the solution is subjected to 200 ma. for 1 hour to form poly-2,5-dimethylenethiophene on the cathode.

A silver counterelectrode was applied to the polymer coated cathode of Example I and electrical measurements indicate that the polymer is an effective capacitor dielectric.

The solvents for the mono- and bis-onium salts should be highly polar and aprotic. Examples of such solvents are: formamide, dimethylformamide, N-methylpropionamide, dimethylsulfoxide, tributylphosphate, hexamethyl phosphoramide, etc.

The process of this invention can be operated as a more or less continuous process. The cathode may be a continuous foil passing through the polymer-precursor solution at a controlled rate so that a pre-determined polymer thickness can be built up on the foil. The process can permit the deposition of a film roughly 1000 A.–10,-000 A. thick. For capacitor manufacture, the cathode can be metal plates or foils of aluminum, titanium, tantalum, niobium, etc.

The process conditions are flexible and conditions can be selected by one skilled in the art to facilitate solution of the solute in the solvent, agitation to insure uniformity of concentration, etc.

Since it is obvious that many changes and modifications can be made in the above-described details without departing from the nature and spirit of the invention, it is to be understood that the invention is not limited to said details except as set forth in the appended claims.

What is claimed is:

1. A method of electrochemically depositing on a metal surface a polymer having the formula:

($-$CHR$-$Ar$-$CH$_2-$)$_n$ where $n$ is greater than 10; R is hydrogen or a monovalent hydrocarbon; and Ar is a divalent aromatic radical, the two valences of which are located on each terminal carbon atom of a chain of 2 or 4 of the ring atoms, said chain having one unit of aromatic unsaturation for each two ring atoms, comprising: making said metal the cathode in a solution of a solvent containing a mono- or bis-onium salt selected from the group consisting of $$Z(-CH_2-\overset{+}{N}R_1R_2R_3)_mX^-_m;\ Z(-CH_2-\overset{+}{P}R_1R_2R_3)_mX^-_m\ \text{and}$$

$$Z(CH_2-\overset{+}{S}R_1R_2)_mX^-_m$$

wherein $m$ is 1 or 2; $R_1$, $R_2$ and $R_3$ are $C_1$–$C_{18}$ hydrocarbyl groups; Z is a substituted or unsubstituted aromatic ring; and X is the anion of a strong inorganic acid; and when $m$ is 1, the methylene radical is attached to a carbon atom of said aromatic ring so as to be separated by a chain of 2 or 4 ring atoms from an unsubstituted hydrocarbyl group attached to another ring carbon atom; and when $m$ is 2, the methylene radicals are attached to different carbon atoms of the aromatic ring so as to be separated by a chain of 2 to 4 ring atoms; immersing an anode in said solution and subjecting said solution to electrolysis, whereby said polymer deposits on said cathode.

2. The process of claim 1 wherein the onium salt is p-methylbenzyltrimethyl-ammonium nitrate.

3. The process of claim 1 wherein the onium salt is p-xylylene bistrimethylammonium nitrate.

4. The process of claim 1 wherein the onium salt is p-xylylene bistributylphosphonium nitrate.

5. The process of claim 1 wherein the onium salt is p-methylbenzyltriphenylphosphonium nitrate.

6. The process of claim 1 wherein the onium salt is p-methylbenzyldimethyl sulfonium nitrate.

7. The process of claim 1 wherein the onium salt is 2,5-pyrroledimethylene-bis-(trimethylammonium nitrate).

8. The process of claim 1 wherein the onium salt is 2,5-pyridinedimethylene bis-(trimethylammonium nitrate).

9. The process of claim 1 wherein the onium salt is 2,5-furandimethylenebis-(trimethylammonium nitrate).

10. The process of claim 1 wherein the onium salt is 5-methyl-2-thenyltrimethylammonium nitrate.

References Cited

UNITED STATES PATENTS

| | | | |
|---|---|---|---|
| 2,530,366 | 11/1950 | Gray | 204—181 |
| 2,800,446 | 7/1957 | Frendenburgh | 204—181 |
| 2,898,279 | 8/1959 | Metcalfe et al. | 204—181 |
| 3,332,866 | 7/1967 | Wszolek | 204—181 |

OTHER REFERENCES

Feinleib: "Electrodeposition of Vinyl Plastics," in The Electrochemical Society, vol. 88, 1945, pp. 11–21.

Wilson: "Polymerization (Electrolytic) of Vinyl Monomers," in The Encyclopedia of Electrochemistry, 1964, pp. 963–964.

JOHN H. MACK, *Primary Examiner.*

E. ZAGARELLA, *Assistant Examiner.*

U.S. Cl. X.R.

204—181